United States Patent
Dodson et al.

(10) Patent No.: US 7,519,988 B2
(45) Date of Patent: Apr. 14, 2009

(54) METHOD AND APPARATUS FOR AUTHENTICATED NETWORK ADDRESS ALLOCATION

(75) Inventors: John Paul Dodson, Pflugerville, TX (US); Robert Kimberlin Foster, Austin, TX (US); Minh Nguyen, Austin, TX (US); Ramachandran Unnikrishnan, Austin, TX (US); Christine I. Wang, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 10/631,066

(22) Filed: Jul. 31, 2003

(65) Prior Publication Data

US 2005/0027868 A1 Feb. 3, 2005

(51) Int. Cl.
*G06F 21/00* (2006.01)
*G06F 15/16* (2006.01)
*H04L 9/32* (2006.01)

(52) U.S. Cl. .......................... 726/4; 713/175; 709/245
(58) Field of Classification Search ....................... None
See application file for complete search history.

(56) References Cited

U.S. PATENT DOCUMENTS

| | | | | |
|---|---|---|---|---|
| 6,178,455 B1 * | 1/2001 | Schutte et al. | ............... | 709/228 |
| 6,208,656 B1 * | 3/2001 | Hrastar et al. | ............... | 370/401 |
| 6,253,327 B1 * | 6/2001 | Zhang et al. | ............... | 726/14 |
| 6,295,298 B1 * | 9/2001 | Hrastar et al. | ............... | 370/409 |
| 6,311,275 B1 * | 10/2001 | Jin et al. | ............... | 726/12 |
| 6,374,295 B2 * | 4/2002 | Farrow et al. | ............... | 709/223 |
| 6,405,253 B1 * | 6/2002 | Schutte et al. | ............... | 709/228 |
| 6,564,216 B2 * | 5/2003 | Waters | ............... | 707/10 |
| 6,643,782 B1 * | 11/2003 | Jin et al. | ............... | 726/3 |
| 6,654,891 B1 * | 11/2003 | Borsato et al. | ............... | 726/6 |
| 6,801,941 B1 * | 10/2004 | Stephens et al. | ............... | 709/225 |
| 6,823,454 B1 * | 11/2004 | Hind et al. | ............... | 713/168 |
| 6,826,690 B1 * | 11/2004 | Hind et al. | ............... | 713/186 |
| 6,922,412 B2 * | 7/2005 | Hrastar et al. | ............... | 370/401 |
| 6,957,276 B1 * | 10/2005 | Bahl | ............... | 709/245 |
| 6,977,906 B2 * | 12/2005 | Owens et al. | ............... | 370/252 |
| 7,016,328 B2 * | 3/2006 | Chari et al. | ............... | 370/331 |
| 7,047,304 B2 * | 5/2006 | Senapati et al. | ............... | 709/229 |
| 7,065,092 B2 * | 6/2006 | Chen et al. | ............... | 370/395.52 |
| 7,103,648 B1 * | 9/2006 | Burrows | ............... | 709/220 |
| 7,154,912 B2 * | 12/2006 | Chong et al. | ............... | 370/486 |
| 7,222,359 B2 * | 5/2007 | Freund et al. | ............... | 726/3 |

(Continued)

OTHER PUBLICATIONS

Droms, "Dynamic Host Configuration Protocol", Mar. 1997, Network Working Group Request for Comments, RFC 2131, p. 1-45.*

(Continued)

*Primary Examiner*—Christopher A Revak
(74) *Attorney, Agent, or Firm*—Yee & Associates, P.C.; Diana L. Roberts-Gerhardt

(57) ABSTRACT

A method, apparatus, and computer instructions for providing addresses to clients. A request is received from a client for an address. A determination is made as to whether authentication information is present in the request. A verification process is performed using the authentication information if the authentication information is presenting the request. A determination is made as to whether the authentication information is authenticated. A privileged address is provided to the client in response to the authentication information being authenticated.

16 Claims, 4 Drawing Sheets

U.S. PATENT DOCUMENTS

| | | | |
|---|---|---|---|
| 2001/0019557 A1* | 9/2001 | Hrastar et al. | 370/401 |
| 2001/0037394 A1* | 11/2001 | Yoshimura et al. | 709/228 |
| 2003/0163584 A1* | 8/2003 | Anderson et al. | 709/245 |
| 2004/0122974 A1* | 6/2004 | Murakami | 709/245 |
| 2004/0139226 A1* | 7/2004 | Margalit et al. | 709/245 |

OTHER PUBLICATIONS

Droms et al "Authentication for DHCP Messages", Jun. 2001, Network Working Group Request for Comments, RFC 3118, p. 1-17.*

Demerjian et al, "E-DHCP: Extended Dynamic Host Configuration Protocol", 2004, IEEE, p. 667-668.*

* cited by examiner

METHOD AND APPARATUS FOR AUTHENTICATED NETWORK ADDRESS ALLOCATION

BACKGROUND OF THE INVENTION

1. Technical Field

The present invention relates generally to an improved network configuration system, in particular to a method and apparatus for allocating addresses to clients on a TCP/IP network. Still more particularly, the present invention provides a method and apparatus for addresses allocation to authenticated clients.

2. Description of Related Art

Computers on a network typically have addresses, such as Internet Protocol (IP) addresses. In some cases, the addresses are static addresses, which may be permanently assigned to a computer. In other cases, the addresses may be automatically assigned to a computer when it logs on to a network, such as a Transmission Control Protocol (TCP)/IP network. With this type of network, a dynamic host configuration protocol (DHCP) server automatically assigns IP addresses to the client computers logging on to the network. This type of process is typically found on a server, but also may be implemented in other types of network devices, such as integrated services digital network (ISDN) routers and modem routers that allow multiple users to access the internet.

DHCP traditionally does not authenticate the identity of the clients before assigning the addresses. This protocol assumes that all of the clients on the network are allowed to obtain addresses from the server. Further, this protocol also allows a DHCP server to provide static IP addresses through a server configuration. In other words, a client that is to receive a static IP address always receives the same address. This type of provision of static IP addresses requires information about the clients in advance. This information uses a media access control (MAC) address to identify an existing client. The server configuration is updated to identify a particular MAC address as being associated with a particular static IP address. In some cases, this information may be unavailable, or may be incorrect. For example, if a hardware change occurs in the client, such as a replacing a faulty Ethernet card, the information regarding the client becomes incorrect.

This type of system requires the server configuration to be updated with the client information. Further, this technique does not provide a mechanism to add clients with static IP address needs to a system without updating the server configuration. Therefore, it would be adventitious to have an improved method, apparatus, and computer instructions for assigning addresses to client.

SUMMARY OF THE INVENTION

The present invention provides a method, apparatus, and computer instructions for providing addresses to clients. The standard DHCP protocol is enhanced to accommodate authentication information. Since the DHCP protocol is used, it will work with existing network systems. Clients who require a privileged address (static or special addresses) will need minimal configuration additional configuration.

When a request is received from a client, a determination is made as to whether authentication information is present in the request. If it is present, the validity of this data is verified. If the identity of the client is verified, a privileged address is provided to the client in response to the authentication information being authenticated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
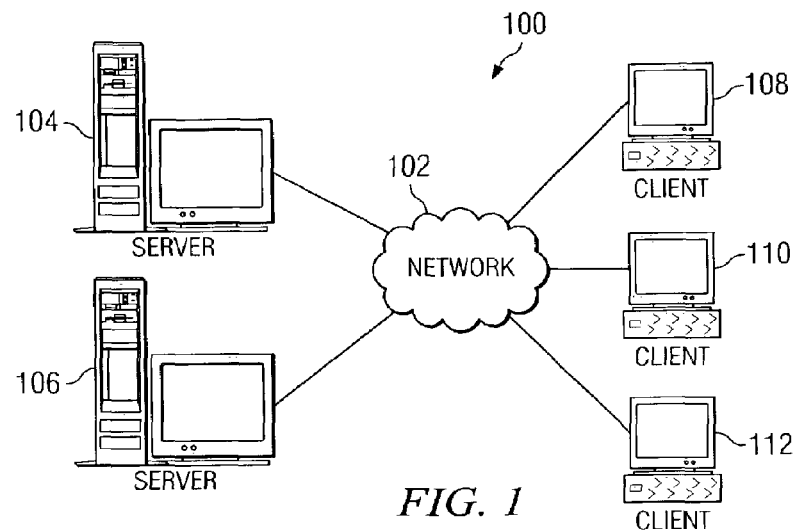
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with server 106. In addition, clients 108, 110, and 112 are connected to network 102. These clients 108, 110, and 112 may be, for example, personal computers or network computers. In the depicted example, server 104 is a DHCP server, which provides addresses, such as IP addresses to clients requesting addresses when logging onto network 102. In this illustration, server 106 and clients 108-112 are clients to server 104 with respect to requesting addresses. Server 106 obtains a static address from server 104, while 108-112 obtain dynamic addresses from server 104.

Server 106 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

The present invention provides the method, apparatus, and instructions for server 104 to authenticate clients, such as server 106 and clients 108-112 before providing an IP address to these clients. In the depicted examples, this mechanism preserves the full functionality of the standard DHCP protocol. Further, minimal configuration changes to the client and server are required. This mechanism is unaffected by hardware changes, such as a change in an adapter that changes a MAC address for the client. This mechanism employs authentication information, such as a pass phrase or a certificate. This authentication information is used by a server to verify the identity of the client.

Figure 2:
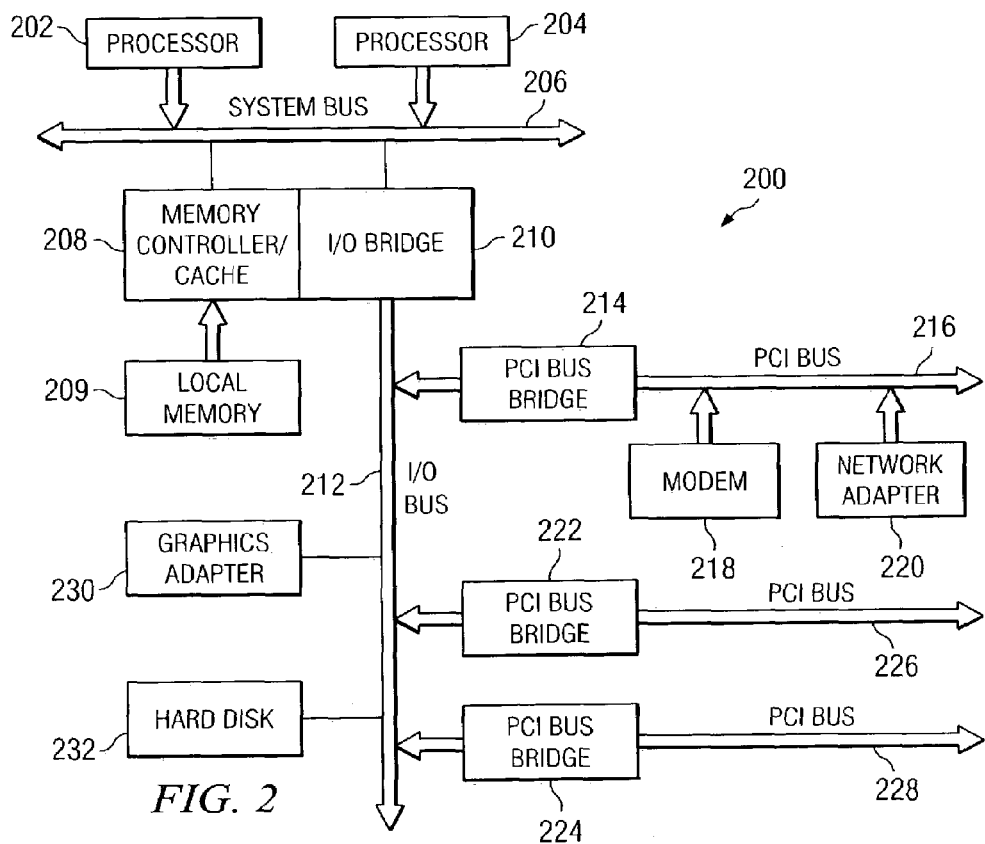
FIG. 2 is a block diagram of a data processing system that may be implemented as a server in accordance with a preferred embodiment of the present invention.

Referring to FIG. 2, a block diagram of a data processing system that may be implemented as a server, such as server 104 or server 106 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
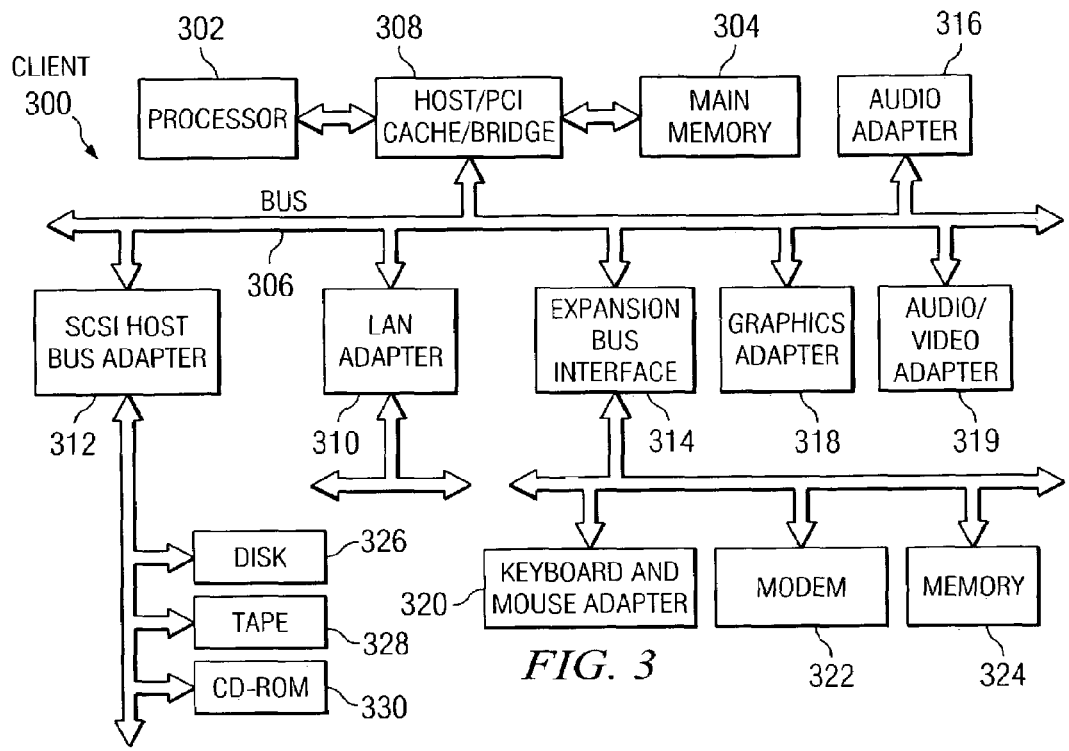
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Linux. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a web appliance.

Figure 4:
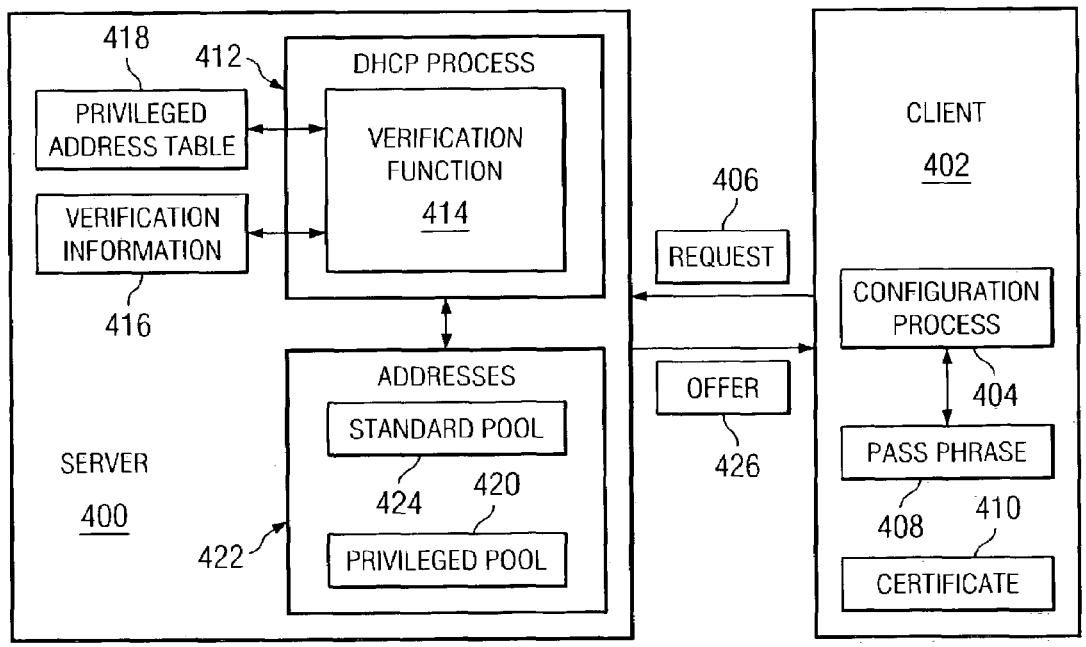
FIG. 4 is a diagram illustrating components used in providing addresses to clients using authentication information in accordance with a preferred embodiment of the present invention.

Turning next to FIG. 4, a diagram illustrating components used in providing addresses to clients using authentication information is depicted in accordance with a preferred embodiment of the present invention. In this example, server 400 is a DHCP server, such as server 104 in FIG. 1. Client 402 is a client, such as server 106 or client 108.

As illustrated, client 402 includes configuration process 404, which sends request 406 to server 400. Request 406 is sent when configuration process 404 logs on client 402 onto a network such as network 102 in FIG. 1. Configuration process 404 includes authentication information within 406. This authentication information may be placed within an options field within request 406. In particular, pass phrase 408 or certificate 410 may be encoded or placed into 406.

Additionally, a client identifier also may be included in request 406 along with the authentication information. Client identifiers are used in the depicted embodiments with passphrases and not with certificates. With certificates, a client identifier is already encoded within the certificate. When a passphrase is used, the system administrator configures the client identifier. For example the system admin would identify the client as "web-server". Further, these identifiers are used when a static address is requested. In these examples, the client identifier is unique for each client on the network. For example, a random number may be appended to a MAC address to form the client identifier.

Pass phrase 408 may be some alpha numeric string that is known by server 400 and authorized clients, such as client 402. Certificate 410 is a digital certificate. This certificate is similar to an ID card used in conjunction with a public key encryption system. Also called "digital IDs," digital certificates are issued by trusted third parties known as certification authorities (CAs) after verifying that a public key belongs to a certain user.

When request 406 is received at server 400, DHCP process 412 processes this request. As part of the processing, request 406 is authenticated using authentication information in request 406. This process is performed using verification function 414. If the authentication information is a pass phrase, verification function 414 checks to see whether the pass phrase is correct in verification information 416. The client identifier is used to check privileged address table 418 to see whether an address is assigned to that client. If an address is assigned to this client the address is issued to the client. If no address is assigned to the client, an unassigned address from the privileged pool is assigned to the client. In these examples, the address is a privileged address from privileged pool 420 in addresses 422. Additionally, privileged address table 418 is updated if the client is assigned an address to allow for the same address to be assigned to the client in response to future requests from that client. These addresses are static addresses.

If the authentication information is a certificate, authentication function 414 first verifies the certificate to make sure that the certificate is authentic. If the certificate is from a trusted authority the certificate is considered to be authentic. At this point, authentication function 414 extracts information from the certificate and compares this information with a privileged address table in verification information 416. A process similar to that for pass phrases described above is performed in assigning or issuing an address to the client.

If the authentication information is missing or incorrect in request 406, DHCP 412 will assign a standard address from standard pool 424 to client 402. In this case, the address assigned to the client may vary when future requests are made. In other words, these addresses are dynamic addresses which use the standard DHCP Protocol.

When an address is assigned, DHCP process 412 creates a response in a form of offer 426. This response is also referred to as a DHCPOFFER packet. Additionally, DHCP process 412 encodes the authentication information into offer 426. Offer 426 is then sent to client 402. Log on process 404 in client 402 authenticates the information. If the information is considered authentic, offer 426 is accepted and the address in offer 426 is used by client 402. On the other hand, if the information is not authentic, the address in offer 426 is rejected.

Figure 5A:
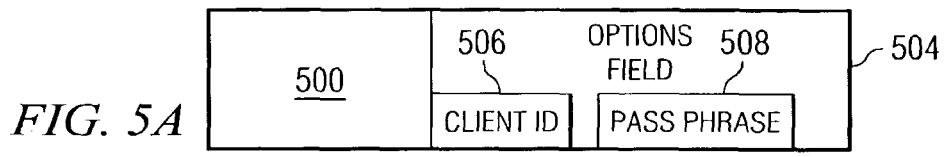
FIGS. 5A and 5B are diagrams illustrating requests for an address in accordance with a preferred embodiment of the present invention.
Figure 5B:
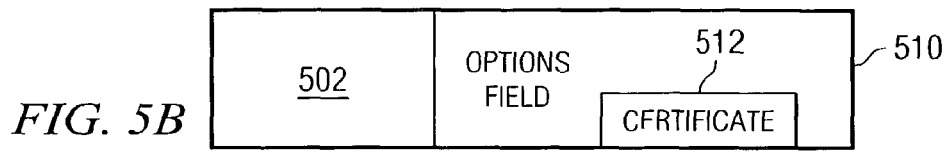

Turning now to FIGS. 5A and 5B, diagrams illustrating requests for an address are depicted in accordance with a preferred embodiment of the present invention. Request 500 in FIG. 5A and request 502 in FIG. 5B are examples of a request, such as request 406 in FIG. 4. Options field 504 in request 500 contains client identifier 506 and pass phrase 508. Options field 510 in request 502 contains certificate 512. The first field in options field 504 and 510 is used to indicate whether the packet is a request or a reply.

Figure 6:
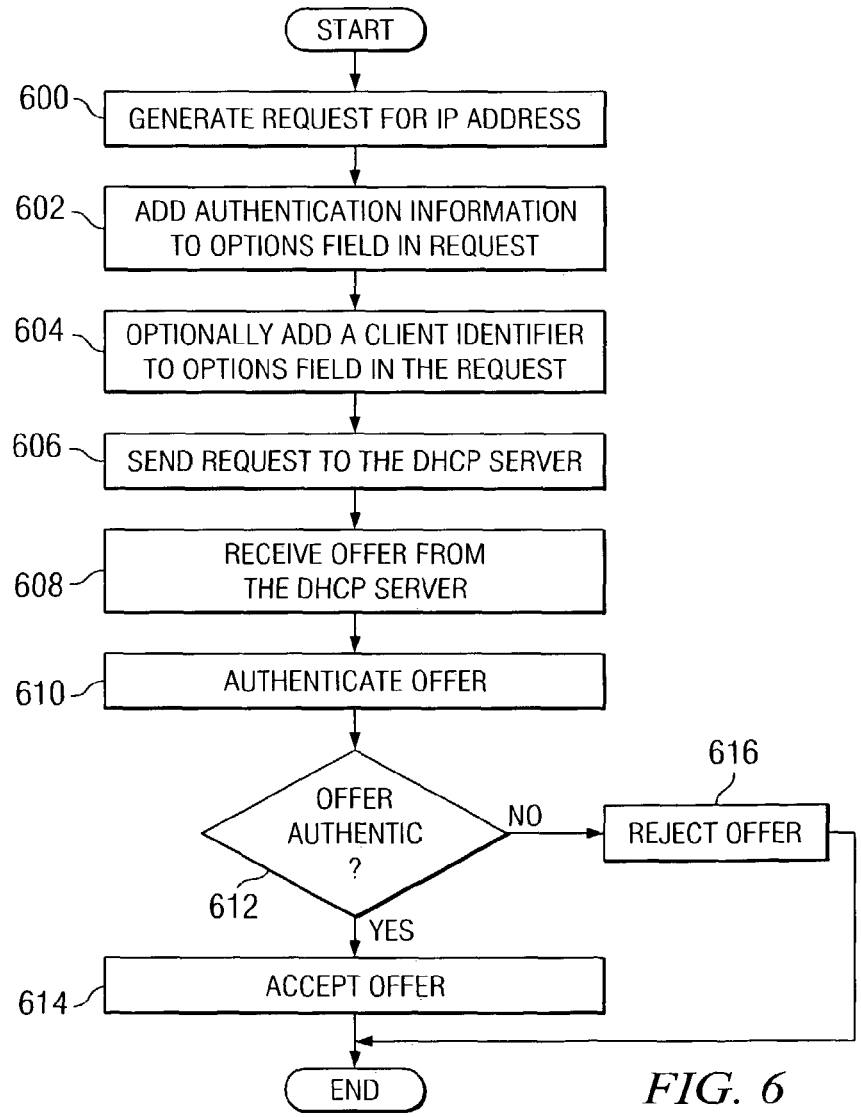
FIG. 6 is a flowchart for a process for generating a request in a client in accordance with a preferred embodiment of the present invention.

With reference next to FIG. 6, a flowchart for a process for generating a request in a client is depicted in accordance with a preferred embodiment of the present invention. The process illustrated in FIG. 6 may be implemented in a client process, such as logon configuration process 404 in FIG. 4.

The process begins by generating a request for an IP address (step 600). Next, authentication information is added to the options field in the request (step 602). These examples, the authentication information may be a pass phrase or a certificate that is encoded to the options field Additionally, a client identifier is optionally added to the options field in the request (step 604). The client identifier is added only in the case in which the authentication information is a passphrase and the client identifier is configured. As mentioned above, client identifiers are needed only for static addresses. If a client identifier is absent, the client receives a dynamic address from the privilege pool. In the depicted embodiment, the client identifier is unique for each client on the network. This client identifier may take various forms. For example, the MAC address may be appended with a randomly generated number to form a client identifier.

Thereafter, the request is then sent to a DHCP server (step 606). An offer is received from the DHCP server (step 608). The offer is then authenticated (step 610). A determination is then made as to whether the offer is authentic (step 612). If the offer is authentic, the offer is accepted (step 614) with the process determining thereafter.

With reference again to step 612, if the offer is not authentic, the offer is rejected (step 616) with the process terminating thereafter.

In some cases the offer is not authentic. The same reasons why a server rejects an offer for lack of correct authentication also applies to the client. For example, if the passphrase sent by the server is wrong or if the DHCP server does not have the mechanism of the present invention implemented, the offer will not contain passphrase data. In the case of using certificates, the certificate may not be from a trusted authority, the certificate may have expired, or the certificate may have been cancelled.

Figure 7:
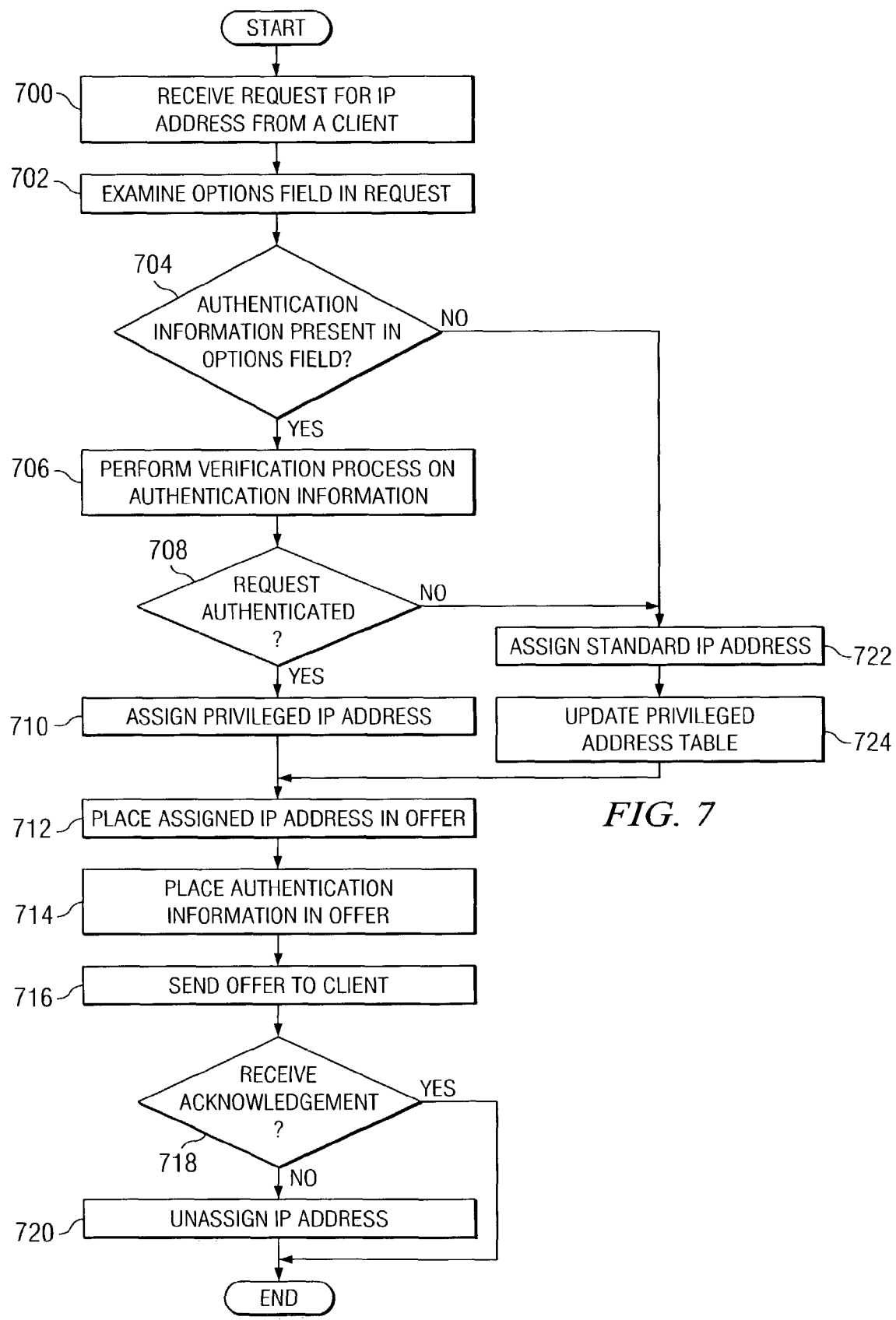
FIG. 7 is a flowchart of a process for handling requests for addresses in accordance with a preferred embodiment of the present invention.

Next, FIG. 7 is a flowchart of a process for handling requests for addresses in accordance with a preferred embodiment of the present invention. The process illustrated in FIG. 7 may be implemented in a server, such as server 400 in FIG. 4.

The process begins by receiving a request for an IP address from a client (step 700). In response to receiving this request, the options field in the request is examined (step 702). A determination is made as to whether authentication information is present in the options field (step 704).

If authentication information is present in the options field, an verification process is performed on the authentication information (step 706). This verification process may take various forms depending on the authentication information used. For example, if a pass phrase is used, the process may involve comparing the pass phrase in the options field of the request with a stored pass phrase to determine whether a match is present. If a certificate is used, a certification process is employed to determine whether the certificate is authentic.

The certification process is similar to those performed by web browsers when presented with a certificate from a web site.

A determination is made as to whether the request has been authenticated by the authentication process (step 708). If the request is authentic, a privileged IP address is assigned to the client (step 710). In step 710, a determination is made as to whether the particular client has an IP address from a previous request. This determination is made by using the client identifier to see whether an IP address has been assigned to this client. The privileged IP address in these examples is a static IP address. Once the IP address is assigned to a client, the same IP address is assigned to that client in subsequent requests made when that client logs on to the network. The assigned IP address is placed into an offer (step 712). Additionally, authentication information is placed into the offer (step 714). The offer is then sent to the client (step 716).

Afterwards, a determination is made as to whether an acknowledgment is received (step 718). If acknowledgement is received, the process terminates. Otherwise, the IP address is unassigned (step 720) with the process terminating thereafter.

With reference again to step 708, if the request is not authenticated, a standard IP address is assigned to the client (step 720). The process then proceeds to step 712 as described above. Turning back to step 704, if authentication information is not present in the options field, the process also proceeds step 720.

Optionally, step 720 may be changed such that no address is assigned if authentication information is not present or if the authentication information is not authenticated by the authentication process. In this type of embodiment, step 710 may be modified to assign a standard IP address. This type of embodiment does not work with standard DHCP systems, but may be employed to prevent unauthorized clients from accessing a network. This feature may be especially desirable when a network provides for wireless communications links to prevent an unauthorized client from accessing the network through one of these wireless links.

Thus, the present invention provides an improved method, apparatus, and computer instructions for handling requests for addresses. The mechanism of the present invention encodes authentication information in a request sent to a server, such as a DHCP server. The server examines the request to authenticate this information. If the information is authenticated, an address is assigned to the client. This address is then returned to the client. Additionally, authentication information may be placed into the reply or offer, returned to the client.

In this manner, addresses may be assigned to clients without requiring an entry to be pre-provisioned or preset in the server. In the depicted examples, an entry is automatically added to the server by the DHCP process when a request is received with the authentication information that is verified to be authentic. This mechanism also allows for authentication on the client side for added security. Additionally, static IP addresses may be assigned without requiring prior knowledge of hardware information, such as a MAC address. Further, this mechanism in the depicted embodiment may be employed with standard DHCP systems. For example, if a client encodes authentication information in a request and sends this request to a DHCP server that does not support the mechanism of the present invention, this information is simply ignored by the server.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications that are suited to the particular use contemplated.

What is claimed is:

1. A computer implemented method in a data processing system for providing addresses to clients, the computer implemented method comprising:

receiving a request from a client for an address, wherein the request comprises a unique client identifier and authentication information, and wherein the authentication information comprises at least one of a pass phrase and a digital certificate;

determining whether the authentication information is present in the request;

responsive to determining that the authentication information is present in the request, performing a verification process on the authentication information to authenticate the request;

responsive to authenticating the request, checking a privileged address table to determine whether a privileged address is assigned to the client, wherein the privileged address is a static internet protocol address in a pool of privileged addresses stored in a memory of the data processing system;

responsive to determining that the privileged address is assigned to the client, assigning the previously assigned privileged address to the client to form a previously assigned privileged address and sending an offer to the client, wherein the offer comprises the previously assigned privileged address and the authentication information; and responsive to determining that the privileged address is not assigned to the client, assigning a unassigned privileged address, from the pool of privileged addresses, to the client to form an assigned privileged address and sending the offer to the client, wherein the offer comprises the assigned privileged address and the authentication information.

2. The computer implemented method of claim 1, further comprising responsive to the authentication information being unverified, denying the request.

3. The computer implemented method of claim 1, further comprising responsive to the authentication information being unauthenticated, providing a standard address to the client.

4. The computer implemented method of claim 1, wherein the previously assigned privileged address is identical to a previous privileged address that was previously provided to the client in response to a previously received request from the client.

5. A computer implemented method in a data processing system for assigning addresses to clients, the computer implemented method comprising:
    sending a request for a privileged address to a server from a client, wherein the request comprises:
    a unique client identifier and authentication information, wherein the authentication information comprises at least one of a pass phrase and a digital certificate, wherein the server performs a verification process on the authentication information to authenticate the request, and wherein the privileged address is a static internet protocol address in a pool of privileged addresses;
    receiving an offer from the server, wherein the offer comprises a privileged address and authentication information;
    determining whether the offer is authentic; and
    responsive to determining that the offer is authentic, accepting the offer.

6. A data processing system for providing addresses to clients, the data processing system comprising:
    a bus system;
    a memory connected to the bus system, wherein the memory includes a set of instructions;
    a communications adaptor connected to the bus system; and
    a processor unit connected to the bus system, wherein the processor unit executes the set of instructions to
    receive a request from a client for an address, wherein the request comprises a unique client identifier and authentication information, and wherein the authentication information comprises at least one of a pass phrase and a digital certificate;
    determine whether the authentication information is present in the request;
    perform a verification process on the authentication information to authenticate the request, responsive to determining that the authentication information is present in the request;
    check a privileged address table to determine whether a privileged address is assigned to the client, wherein the privileged address is a static internet protocol address in a pool of privileged addresses stored in a memory of the data processing system, responsive to authenticating the request;
    assign the previously assigned privileged address to the client to form a previously assigned privileged address and sending means for sending an offer to the client, wherein the offer comprises the previously assigned privileged address and the authentication information, responsive to determining that the privileged address is assigned to the client; and
    assign the privileged address, from the pool of privileged addresses to form an assigned privileged address, to the client and sending means for sending an offer to the client, wherein the offer comprises the assigned privileged address and the authentication information, responsive to determining that the privileged address is not assigned to the client.

7. The data processing system of claim 6, wherein the processing unit executes the set of instructions to denying the request, responsive to the authentication information being unverified.

8. The data processing system of claim 6, wherein the processing unit executes the set of instructions to provide a standard address to the client, responsive to the authentication information being unauthenticated.

9. The data processing system of claim 6, wherein the previously assigned privileged address is identical to a previous privileged address that was previously provided to the client in response to a previously received request from the client.

10. A data processing system for assigning addresses to clients, the data processing system comprising:
    a bus s stem;
    a memory connected to the bus system, wherein the memory includes a set of instructions;
    a communications adaptor connected to the bus system; and
    a processor unit connected to the bus system, wherein the processor unit executes the set of instructions to
    send a request for a privileged address to a server from a client, wherein the request comprises a unique client identifier and authentication information, and wherein the authentication information comprises at least one of a pass phrase and a digital certificate, wherein the server performs a verification process on the authentication information to authenticate the request, and wherein the privileged address is a static internet protocol address in a set of privileged addresses stored in a memory of a data processing system, and wherein the authentication information comprises at least one of a pass phrase and a digital certificate;
    receive an offer, wherein the offer comprises a privileged address and authentication information;
    determine whether the offer is authentic; and
    accept the offer responsive to determining that the offer is authentic.

11. A computer program product stored in a computer readable storage medium storing executable instructions to be executed by a processor for providing addresses to clients when executed by a data processing system, the computer program product comprising:
    instructions for receiving a request from a client for an address, wherein the request comprises a unique client identifier and authentication information, and wherein the authentication information comprises at least one of a pass phrase and a digital certificate;
    instructions for determining whether the authentication information is present in the request;
    instructions for performing a verification process on the authentication information to authenticate the request responsive to determining that the authentication information is present in the request;
    instructions for checking a privileged address table to determine whether an privileged address is assigned to the client, responsive to authenticating the request, wherein the privileged address is a static internet protocol address in a pool of privileged addresses stored in a memory of the data processing system;
    instructions for assigning the previously assigned privileged address to the client and sending an offer to the client, responsive to determining that the privileged address is assigned to the client forming a previously assigned privileged address, wherein the offer comprises the previously assigned privileged address and the authentication information; and
    instructions for assigning the privileged address from the pool of privileged addresses to the client and sending an offer to the client, responsive to determining that the privileged address is not assigned to the client forming an assigned privileged address, wherein the offer comprises the assigned privileged address and the authentication information.

12. The computer program product of claim 11, further comprising instructions for denying the request responsive to the authentication information being unverified.

13. The computer program product of claim 11, further comprising instructions for providing a standard address to the client responsive to the authentication information being unauthenticated.

14. The computer program product of claim 11, wherein the previously assigned privileged address is identical to a previous privileged address that was previously provided to the client in response to a previously received request from the client.

15. A computer program product stored in a computer readable storage medium storing executable instructions to be executed by a processor in a data processing system for assigning addresses to clients when executed by the data processing system, said computer program product comprising:

instructions for sending a request for a privileged address to a server from a client, wherein the request comprises a unique client identifier and authentication information, and wherein the authentication information comprises at least one of a pass phrase and a digital certificate, wherein the server performs a verification process on the authentication information to authenticate the request, and wherein the privileged address is a static a internet protocol address in a set of privileged addresses stored in a memory of a data processing system and wherein the authentication information comprises at least one of a pass phrase and a digital certificate;

instructions for receiving an offer, wherein the offer comprises a privileged address and authentication information;

instructions for determining whether the offer is authentic; and instructions for accepting the offer, responsive to determining that the offer is authentic.

16. A data processing system for providing addresses to clients, the data processing system comprising:

a bus system;

a memory connected to the bus system, wherein the memory includes a set of instructions;

a communications adaptor connected to the bus system; and a processor unit connected to the bus system, wherein the processor unit executes the set of instructions to receive a request from a client for an address, wherein the request comprises a unique client identifier and authentication information, and wherein the authentication information comprises at least one of a pass phrase and a digital certificate;

determine whether the authentication information is present in the request;

perform a verification process on the authentication information to authenticate the request, responsive to determining that the authentication information is present in the request;

check a privileged address table to determine whether a privileged address is assigned to the client, responsive to authenticating the request, wherein the privileged address is a static internet protocol address in a pool of privileged addresses stored in a memory of a data processing system;

assign the previously assigned privileged address to the client to form a previously assigned privileged address and sending an offer to the client, responsive to determining that the privileged address is assigned to the client, wherein the offer comprises the previously assigned privileged address and the authentication information; and assign the privileged address, from the pool of privileged addresses to form an assigned privileged address, to the client and sending the offer to the client, responsive to determining that the privileged address is not assigned to the client, wherein the offer comprises the privileged address and the authentication information.

* * * * *